United States Patent
Dong et al.

(10) Patent No.: US 10,809,401 B2
(45) Date of Patent: Oct. 20, 2020

(54) METHOD AND DEVICE FOR DETERMINING OVERALL MEASUREMENT OF SEISMIC OBSERVATION SYSTEM REPEATABILITY

(71) Applicants: CHINA NATIONAL PETROLEUM CORPORATION, Beijing (CN); BGP Inc., China National Petroleum Corporation, Hebei (CN)

(72) Inventors: Fengshu Dong, Beijing (CN); Haiyan Quan, Beijing (CN); Minxue Luo, Beijing (CN); Chaohong Xu, Beijing (CN); Xiuyan Xin, Beijing (CN); Yuehong Jing, Beijing (CN)

(73) Assignees: CHINA NATIONAL PETROLEUM CORPORATION, Beijing (CN); BGP INC., CHINA NATIONAL PETROLEUM CORPORATION, Hebei (CN)

( * ) Notice: Subject to any disclaimer, the term of this patent is extended or adjusted under 35 U.S.C. 154(b) by 318 days.

(21) Appl. No.: 15/954,065

(22) Filed: Apr. 16, 2018

(65) Prior Publication Data
US 2018/0231679 A1 Aug. 16, 2018

Related U.S. Application Data

(63) Continuation of application No. PCT/CN2016/110294, filed on Dec. 16, 2016.

(51) Int. Cl.
*G01V 1/30* (2006.01)
*G01V 1/00* (2006.01)

(52) U.S. Cl.
CPC ............. *G01V 1/308* (2013.01); *G01V 1/003* (2013.01); *G01V 2200/14* (2013.01); *G01V 2210/612* (2013.01)

(58) Field of Classification Search
CPC .. G01V 1/308; G01V 1/003; G01V 2210/612; G01V 2200/14; G01V 1/30; G01V 2210/14; G01V 2210/16
See application file for complete search history.

(56) References Cited

U.S. PATENT DOCUMENTS

| 3,704,444 A | 11/1972 | Schmitt |
| 6,901,333 B2 | 5/2005 | Van Riel et al. |

(Continued)

FOREIGN PATENT DOCUMENTS

| CN | 101598808 A | 12/2009 |
| CN | 104597493 A | 5/2015 |
| CN | 105549083 A | 5/2016 |

OTHER PUBLICATIONS

Extended European Search Report for European Patent Application No. 16877673.0, dated Sep. 4, 2019, 11 pages.

(Continued)

*Primary Examiner* — Mohammad K Islam
(74) *Attorney, Agent, or Firm* — Hoffman Warnick LLC

(57) ABSTRACT

The present application provides a method and device for determining overall metrics of seismic geometry repeatability, wherein the method comprises: selecting baseline geometry and monitor geometry; matching shot-receiver pairs of the baseline geometry with shot-receiver pairs of the monitor geometry to obtain multiple matching relationships; calculating overall geometry repeatability of each of the multiple matching relationships according to a predetermined calculation formula for multi-trace geometry repeatability, to obtain overall geometry repeatabilities corresponding to the multiple matching relationships; taking the minimum value among the overall geometry repeatabilities corresponding to the multiple matching relationships as overall repeatability metrics between the monitor geometry and the baseline geometry. In the embodiments of the (Continued)

present application, by using the above method, the aim of accurately determining repeatability of multiple shot-receiver pairs in time-lapse seismic acquisition can be achieved, and thus the monitoring efficiency of seismic geometry repeatability can be improved.

8 Claims, 3 Drawing Sheets

(56) References Cited

U.S. PATENT DOCUMENTS

| | | | |
|---|---|---|---|
| 7,773,455 B2* | 8/2010 | Pickering | G01V 1/308 367/38 |
| 8,103,453 B2* | 1/2012 | Abma | G01V 1/36 702/16 |
| 9,684,085 B2* | 6/2017 | Grion | G01V 1/308 |
| 10,416,327 B2* | 9/2019 | Akcelik | G01V 1/282 |
| 2009/0290449 A1 | 11/2009 | Smith et al. | |
| 2014/0012508 A1 | 1/2014 | Gregor | |
| 2014/0019465 A1* | 1/2014 | Gregor | G06F 16/21 707/754 |
| 2014/0172307 A1* | 6/2014 | Svay | G01V 1/308 702/14 |
| 2014/0198605 A1* | 7/2014 | Grion | G01V 1/308 367/7 |
| 2014/0297191 A1* | 10/2014 | Svay | G01V 1/34 702/16 |
| 2015/0168575 A1 | 6/2015 | Hatchell et al. | |
| 2016/0161619 A1* | 6/2016 | Holschuh | G01V 1/303 702/18 |
| 2016/0161620 A1* | 6/2016 | Hoeber | G01V 1/308 367/14 |

OTHER PUBLICATIONS

Naeini et al., "Simultaneous Multi-Vintage 4D Binning," 71st EAGE Conference & Exhibition, Amsterdam, The Netherlands, Jun. 8-11, 2009, 6 pages.
Dong et al., "Matched Multi-Trace Weighted RMS Geometry Repeatability for Time-Lapse Seismic," Chinese Journal of Geophysics, vol. 59, No. 4, Oct. 10, 2016, pp. 442-456.
Johnston, "Practical Applications of Time-lapse Seismic Data," Society of Exploration Geophysicists, The international society of applied geophysics, Mar. 28, 2013, 282 pages.
International Search Report for International Application No. PCT/CN2016/110294 dated Mar. 16, 2017, 3 pages.
Chinese Search Report for Chinese Patent Application No. CN 2015109936655.1 dated May 12, 2017, 5 pages.
Chinese Office Action for corresponding Chinese Patent Application No. CN 2015109936655.1 dated May 12, 2017, 8 pages.
Hao, et al. "A Flexibility Study on Time-lapse Seismic Survey," Journal of Southwest Petroleum University, vol. 29, No. S1, pp. 1-4, 2007.
Dong et al., "Matched multi-trace geometry repeatability for time lapse seismic," Chinese Journal of Geophysics, vol. 59, No. 8, Aug. 2016, 12 pages.
Dong, "Repeatability in Time-lapse Seismic," The University of Chinese Academy of Sciences, Institute of Geology and Geophysics, Jun. 2016, 142 pages.
Dong et al., "Matched Multi-Trace Weighted RMS Geometry Repeatability for Time-Lapse Seismic," Chinese Journal of Geophysics, vol. 59, No. 4, 2016, pp. 442-456.
Guo, "Repeatability Measurement and Consistency Analysis Method of Time Lapse Seismic Data", Computing Techniques for Geophysical and Geochemical Exploratin, vol. 34, No. 2, Mar. 2012, Refer to the International Search Report.
Qin et al., "Analysis of Time-Lapse Seismic Technology and it Application", Progress in Exploration Geophysics, vol. 30, No. 3, Jun. 2007, pp. 219-225, 237.

* cited by examiner

METHOD AND DEVICE FOR DETERMINING OVERALL MEASUREMENT OF SEISMIC OBSERVATION SYSTEM REPEATABILITY

This application is a continuation application of international application No. PCT/CN2016/110294, filed on Dec. 16, 2016, which claims priority to Chinese Patent Application No. 201510993665.1, filed on Dec. 25, 2015, with the title "Method and Device for Determining Overall Metrics Of Seismic Geometry Repeatability", both of which are hereby incorporated by reference in their entireties.

TECHNICAL FIELD

The present application relates to the technical field of oil exploration, especially relates to a method and device for determining overall metrics of seismic geometry repeatability.

BACKGROUND

Currently, many old oil fields have entered the middle and later stages of development, fluid distribution and oil reservoir development within rocks are complex, the average value of oil recovery rate is low, and thus a large amount of remaining oil exists. The time-lapse seismic technology comprehensively interprets the change of oil reservoir differences by using seismic data before and after a period in combination with the data of seismic survey, development and well logging, etc., to obtain main distribution areas of remaining oil, guide adjustments of oil reservoir development solutions, recognize positions of remaining oil among wells, and improve the oil and gas recovery rate. Therefore, in the oil reservoir management, the time-lapse seismic technology plays an important role.

The key to the success of the time-lapse seismic technology lies in repeatability, thus an effective method for repeatability metrics and consistency analysis of time-lapse seismic data is needed. In the time-lapse seismic acquisition in an offshore streamer mode, existing techniques for evaluating seismic geometry repeatability have shot point deviation evaluation, feather angle deviation evaluation, azimuth deviation evaluation and repeatability evaluation for a single offset. Wherein, the shot point deviation evaluation, the feather angle deviation evaluation or the azimuth deviation evaluation is performed for partial components therein when performing the repeatability evaluation on the geometry; while as for the repeatability evaluation for a single offset, although it is performed for whole components, only a single shot-receiver pair therein is evaluated, and for the case of multiple shot-receiver pairs, currently, no specific method for determining repeatability has been disclosed. However, before proposing techniques in the present application, the inventor Fengshu DONG has carried out a systematical and theoretical study on multi-trace repeatability and formed a theory, meanwhile he has planned to disclose and publish the studied theory, which realizes disclosing and publish the theory after the priority date of the present application (Fengshu DONG, 2016, RESEARCH ON SURVEY REPEATABILITY IN TIME-LAPSE SEISMIC [PhD thesis], Beijing: University of Chinese Academy of Sciences, Institute of Geology and Geophysics, Chinese Academy of Sciences; Fengshu DONG, Liyun F U, Haiyan QUAN et al, 2016, MATCHED MULTI-TRACE GEOMETRY REPEATABILITY FOR TIME LAPSE SEISMIC, Chinese Journal of Geophysics, 59(8): 3056-3067, doi: 10.6038/cjg20160828; Feng-Shu, D., Li-Yun, F., Hai-Yan, Q., Ke-Tong, D. and Xiu-Yan, X. (2016), MATCHED MULTI-TRACE WEIGHTED RMS GEOMETRY REPEATABILITY FOR TIME-LAPSE SEISMIC. Chinese Journal of Geophysics, 59: 442-456. doi:10.1002/cjg2.20248).

As for the above problem of how to determine repeatability of multiple shot-receiver pairs in seismic acquisition, currently, no effective solution has been proposed publicly. The present application is completed based on the above theory, and the reasonability of the application is supported by this theory.

SUMMARY

The embodiments of the present application provide a method and device for determining overall metrics of seismic geometry repeatability, so as to achieve the aim of accurately determining repeatability of multiple shot-receiver pairs in time-lapse seismic acquisition.

The embodiments of the present application provide a method for determining overall metrics of seismic geometry repeatability, comprising: selecting baseline geometry and monitor geometry within a predetermined range of geometry; matching shot-receiver pairs of the baseline geometry with shot-receiver pairs of the monitor geometry to obtain multiple matching relationships, calculating overall geometry repeatability of each of the multiple matching relationships, respectively, according to a predetermined calculation formula for multi-trace geometry repeatability, to obtain overall geometry repeatabilities corresponding to the multiple matching relationships; taking the minimum value among the overall geometry repeatabilites corresponding to the multiple matching relationships as overall repeatability metrics between the monitor geometry and the baseline geometry.

In an embodiment, the predetermined calculation formula for multi-trace geometry repeatability is expressed as:
wherein, represents overall geometry repeatability, represents the number of baseline shot-receiver pairs matched in a current matching relationship, represents an offset of the $i^{th}$ baseline shot-receiver pair in the current matching relationship, i=1, 2, . . . , m, represents a weighting coefficient of the $^{th}$ baseline shot-receiver pair in the current matching relationship, represents repeatability between the $^{th}$ baseline shot-receiver pair and a corresponding monitor shot-receiver pair in the current matching relationship.

In an embodiment, the step of matching the shot-receiver pairs of the baseline geometry with the shot-receiver pairs of the monitor geometry to obtain the multiple matching relationships comprises: counting the number of shot-receiver pairs of the baseline geometry and the number of shot-receiver pairs of the monitor geometry; matching the shot-receiver pairs of the baseline geometry with the shot-receiver pairs of the monitor geometry, according to the counting result of the number of shot-receiver pairs of the baseline geometry and the number of shot-receiver pairs of the monitor geometry, to obtain the multiple matching relationships.

In an embodiment, the step of matching the shot-receiver pairs of the baseline geometry with the shot-receiver pairs of the monitor geometry according to the counting result of the number of shot-receiver pairs of the baseline geometry and the number of shot-receiver pairs of the monitor geometry to obtain the multiple matching relationships comprises: when the number of shot-receiver pairs of the monitor geometry is larger than the number of shot-receiver pairs of the baseline geometry, discarding shot-receiver pairs of the monitor geometry remained unmatched after matching; when the number of shot-receiver pairs of the monitor geometry is smaller than the number of shot-receiver pairs of the baseline geometry, assigning a predetermined value to each of one or more shot-receiver pairs of the baseline geometry remained unmatched after matching as repeatability between each of the one or more shot-receiver pairs of the baseline geometry and a corresponding shot-receiver pair of the monitor geometry.

In an embodiment, the step of selecting the baseline geometry and the monitor geometry within the predetermined range of geometry comprises: selecting the baseline geometry and the monitor geometry according to a bin in which mid points locate and according to an offset range; or selecting the baseline geometry and the monitor geometry according to a bin in which reflection points locate and according to an offset range.

The embodiments of the present application further provide a device for determining overall metrics of seismic geometry repeatability, comprising: a memory for storing instructions; and a processor, wherein the processor is coupled to the memory and is configured to perform the following operations when executing the instructions stored in the memory: select baseline geometry and monitor geometry within a predetermined range of geometry; match shot-receiver pairs of the baseline geometry with shot-receiver pairs of the monitor geometry to obtain multiple matching relationships; calculate overall geometry repeatability of each of the multiple matching relationships, respectively, according to a predetermined calculation formula for multi-trace geometry repeatability, to obtain overall geometry repeatabilities corresponding to the multiple matching relationships; take the minimum value among the overall geometry repeatabilities corresponding to multiple matching relationships as overall repeatability metrics between the monitor geometry and the baseline geometry.

In an embodiment, the processor is specifically configured to calculate the multi-trace geometry repeatability according to the following predetermined formula:
wherein, represents overall geometry repeatability, represents the number of baseline shot-receiver pairs matched in a current matching relationship, represents an offset of the $i^{th}$ baseline shot-receiver pair in the current matching relationship, i=1, 2, . . . , m, represents a weighting coefficient of the $^{th}$ baseline shot-receiver pair in the current matching relationship, represents repeatability between the $^{th}$ baseline shot-receiver pair and a corresponding monitor shot-receiver pair in the current matching relationship.

In an embodiment, the processor is further configured to count the number of shot-receiver pairs of the baseline geometry and the number of shot-receiver pairs of the monitor geometry; a relationship matching unit for matching the shot-receiver pairs of the baseline geometry with the shot-receiver pairs of the monitor geometry, according to the counting result of the number of shot-receiver pairs of the baseline geometry and the number of shot-receiver pairs of the monitor geometry, to obtain the multiple matching relationships.

In an embodiment, the processor is further configured to discard shot-receiver pairs of the monitor geometry remained unmatched after matching when the number of shot-receiver pairs of the monitor geometry is larger than the number of shot-receiver pairs of the baseline geometry; and assign a predetermined value to each of one or more shot-receiver pairs of the baseline geometry remained unmatched after matching as repeatability between each of the one or more shot-receiver pairs of the baseline geometry and a corresponding shot-receiver pair of the monitor geometry when the number of shot-receiver pairs of the monitor geometry is smaller than the number of shot-receiver pairs of the baseline geometry.

In an embodiment, the processor is further configured to select the baseline geometry and the monitor geometry according to a bin in which mid points locate and according to an offset range; or, select the baseline geometry and the monitor geometry according to a bin in which reflection points locate and according to an offset range.

In the embodiments of the present application, during the calculation of seismic geometry repeatability, baseline geometry and monitor geometry are selected within a predetermined range of geometry firstly, then shot-receiver pairs of the baseline geometry and shot-receiver pairs of the monitor geometry are matched with each other to obtain multiple matching relationships, then calculations are conducted for the above multiple matching relationships respectively, according to a calculation formula for multi-trace geometry repeatability, so that overall geometry repeatability corresponding to each of the multiple matching relationships can be obtained. The minimum value among the corresponding repeatabilities is taken as overall repeatability metrics between the monitor geometry and the baseline geometry. By using the above method, the situation of different number and uncertain matching of shot-receiver pairs between the baseline geometry and the monitor geometry can be solved, and the aim of accurately determining repeatability of multiple shot-receiver pairs in time-lapse seismic acquisition can be achieved.

BRIEF DESCRIPTION OF DRAWINGS

Accompanying drawings described here, which serve to provide further understanding of the present application, constitute a part of the present application, but do not constitute the limitation to the present application. In the drawings.

DESCRIPTION OF EMBODIMENTS

In order to make the purposes, technical solutions and advantages of the present application more clearly, the present application is further described in detail as follows in combination with embodiments and the accompanying drawings. Here, the schematic embodiments of the present application and description thereof are intended to explain the present application, but are not intended to limit the present application.

Figure 1:
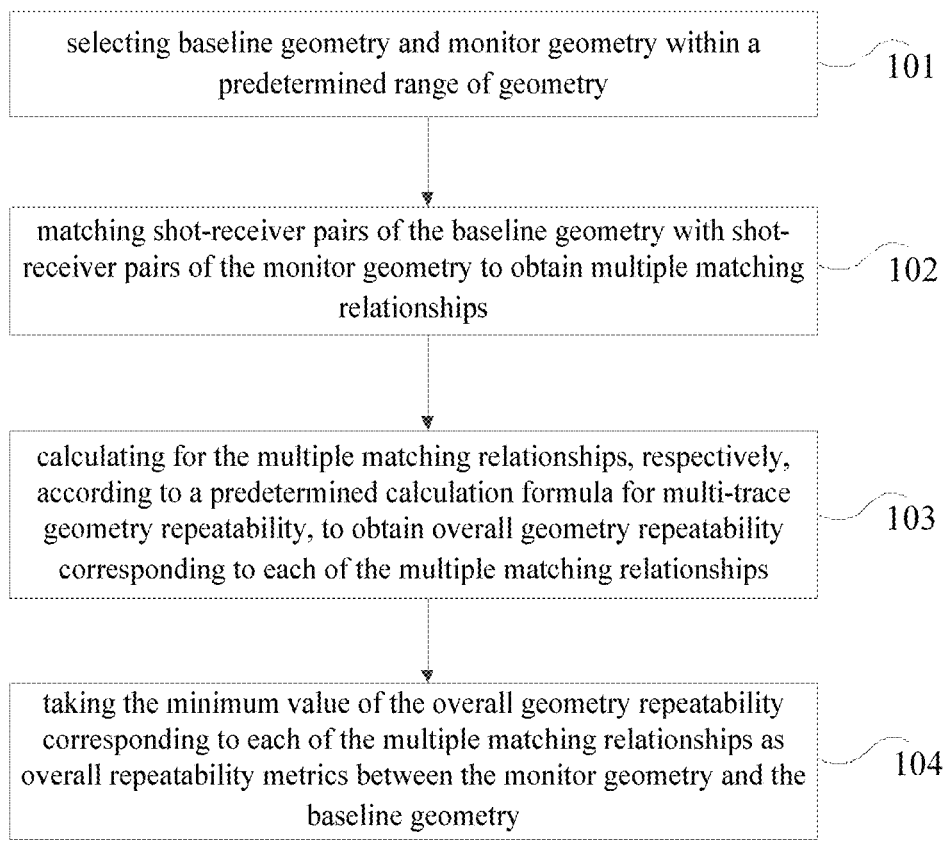
FIG. 1 is a flow chart of a method for determining overall metrics of seismic geometry repeatability in an embodiment of the present application.

Considering when evaluating seismic geometry repeatability, if an accurate evaluation result is required to be obtained, the number of shot-receiver pairs which participate in the repeatability evaluation needs to be increased greatly; if the number of shot-receiver pairs is too small, it is impossible to provide a reliable evaluation for a seismic geometry. Specifically, it provides a method for determining overall metrics of seismic geometry repeatability in this example, as shown in FIG. 1, which may comprise the following steps:

Step 101: selecting baseline geometry and monitor geometry within a predetermined range of geometry;

For a seismic system, in particular for a time-lapse seismic system, when acquiring seismic data, acquisition needs to be conducted for seismic systems in different situations. Wherein, data obtained from the first acquisition is referred to as baseline seismic data; data, obtained from the acquisition performed again according to demands after experiencing a period of human intervention, is referred to as monitored seismic data. Through multiple explorations, it may obtain seismic data for exploration targets at different time and know differences of seismic data for exploration targets at different time, thereby the effect of human intervention, such as oil and gas exploitation, to an exploration target may be obtained.

Specifically, in this embodiment, baseline geometry and monitor geometry may be selected according to a bin in which the mid points locate and according to an offset range; or baseline geometry and monitor geometry can be selected according to a bin in which the reflection points locate and according to an offset range.

Step 102: matching shot-receiver pairs of the baseline geometry with shot-receiver pairs of the monitor geometry to obtain multiple matching relationships;

In this embodiment, by matching shot-receiver pairs of the baseline geometry with shot-receiver pairs of the monitor geometry, a repeatability evaluation can be performed on multiple shot-receiver pairs in the seismic acquisition. Specifically, matching shot-receiver pairs of the baseline geometry with shot-receiver pairs of the monitor geometry may comprise the following steps:

S1: counting the number of shot-receiver pairs of the baseline geometry and the number of shot-receiver pairs of the monitor geometry, respectively;

S2: matching shot-receiver pairs of the baseline geometry with shot-receiver pairs of the monitor geometry, according to the counting result of the number of shot-receiver pairs of the baseline geometry and the number of shot-receiver pairs of the monitor geometry, to obtain multiple matching relationships.

When matching shot-receiver pairs of the baseline geometry with shot-receiver pairs of the monitor geometry, the following two situations may occur: when the number of shot-receiver pairs of the monitor geometry is larger than the number of shot-receiver pairs of the baseline geometry, remaining unmatched shot-receiver pairs of the monitor geometry can be discarded after matching; when the number of shot-receiver pairs of the monitor geometry is smaller than the number of shot-receiver pairs of the baseline geometry, if there is no corresponding shot-receiver pairs in the monitor geometry corresponding to shot-receiver pairs in the baseline geometry, a predetermined value for each of one or more shot-receiver pairs of the baseline geometry remained after matching can be assigned, as repeatability between each of the one or more shot-receiver pairs of the baseline geometry and the corresponding shot-receiver pair of the monitor geometry.

Accordingly, after performing the matching according to the counting result of the number of shot-receiver pairs of the baseline geometry and the number of shot-receiver pairs of the monitor geometry, multiple matching relationships can be obtained.

For example, when the number of shot-receiver pairs of the monitor geometry is five and the number of shot-receiver pairs of the baseline geometry is three, after matching three shot-receiver pairs of the baseline geometry with three shot-receiver pairs of the monitor geometry, the remaining two shot-receiver pairs of the monitor geometry are discarded, and finally matching relationships can be obtained; when the number of shot-receiver pairs of the monitor geometry is four and the number of shot-receiver pairs of the baseline geometry is five, after matching four shot-receiver pairs of the baseline geometry with four shot-receiver pairs of the monitor geometry, one shot-receiver pair of the baseline geometry is remained, a predetermined value is assigned as the repeatability between the remaining one shot-receiver pair of the baseline geometry and the corresponding shot-receiver pair of the monitor geometry, and finally matching relationships can be obtained.

However, it should be noted that five shot-receiver pairs in the above example are only a schematic description, and in actual implementation, there may be other amount of shot-receiver pairs, such as six or ten, etc., and the specific amount of shot-receiver pairs is not limited in the present application.

Step 103: calculating overall geometry repeatability of each of the multiple matching relationships according to a predetermined calculation formula for multi-trace geometry repeatability, respectively, to obtain overall geometry repeatabilities corresponding to the multiple matching relationships;

Studies show that the repeatability of geometry obviously affects the repeatability of time-lapse seismic data. The repeatability of geometry can be represented as a sum of geometry's shot point deviation and receiver point deviation, but in this embodiment, the repeatability of geometry can be represented as the distance between a shot point of the monitor geometry and a shot point of the baseline geometry plus the distance between a receiver point of the monitor geometry and a receiver point of the baseline geometry. Specifically, the repeatability of seismic waveform data can be calculated by normalizing a mean square root of difference data between two sets of seismic data in a given time window, the calculation formula is as follows:

wherein, represents repeatability between a baseline shot-receiver pair and a corresponding monitor shot-receiver pair in the current matching relationship, represents seismic data monitored by the monitor geometry in the current matching relationship, represents seismic data observed by the baseline geometry in the current matching relationship, represents the number of sampling points of seismic waveform data from the start recording time to the end recording time in the current matching relationship, rms is the abbreviation of root-mean-square.

Further, a predetermined calculation formula for multi-trace geometry repeatability is applied to calculate overall geometry repeatability of each of the obtained multiple matching relationships, respectively. The calculation formula for overall geometry repeatability can be expressed as:

wherein, represents overall geometry repeatability, represents the number of baseline shot-receiver pairs matched in a current matching relationship, represents an offset of the $i^{th}$ baseline shot-receiver pair in the current matching relationship, i=1, 2, . . . , m, represents a weighting coefficient of the $^{th}$ baseline shot-receiver pair in the current matching relationship, represents repeatability between the $^{th}$ baseline shot-receiver pair and a corresponding monitor shot-receiver pair in the current matching relationship.

In the above formula, the weighting coefficient keeps the same during the calculation of repeatability of the current matching relationship and during the comparison of overall geometry repeatability.

After the above calculation, the overall geometry repeatability corresponding to each of the multiple matching relationships can be obtained.

Step 104: taking the minimum value among the overall geometry repeatabilities corresponding to the multiple matching relationships as overall repeatability metrics between the monitor geometry and the baseline geometry;

A specific application example of the method for determining overall repeatability metrics of seismic geometry is described below. In this embodiment, the repeatability of geometry corresponding to each Common Mid Point (referred as CMP) bin into which the mid points fall in a certain area is calculated by using the above method for determining overall repeatability metrics of seismic geometry. However, it should be noted that this specific embodiment is only for better explaining the present application, but does not constitute improper limitation to the present application.

Figure 2:
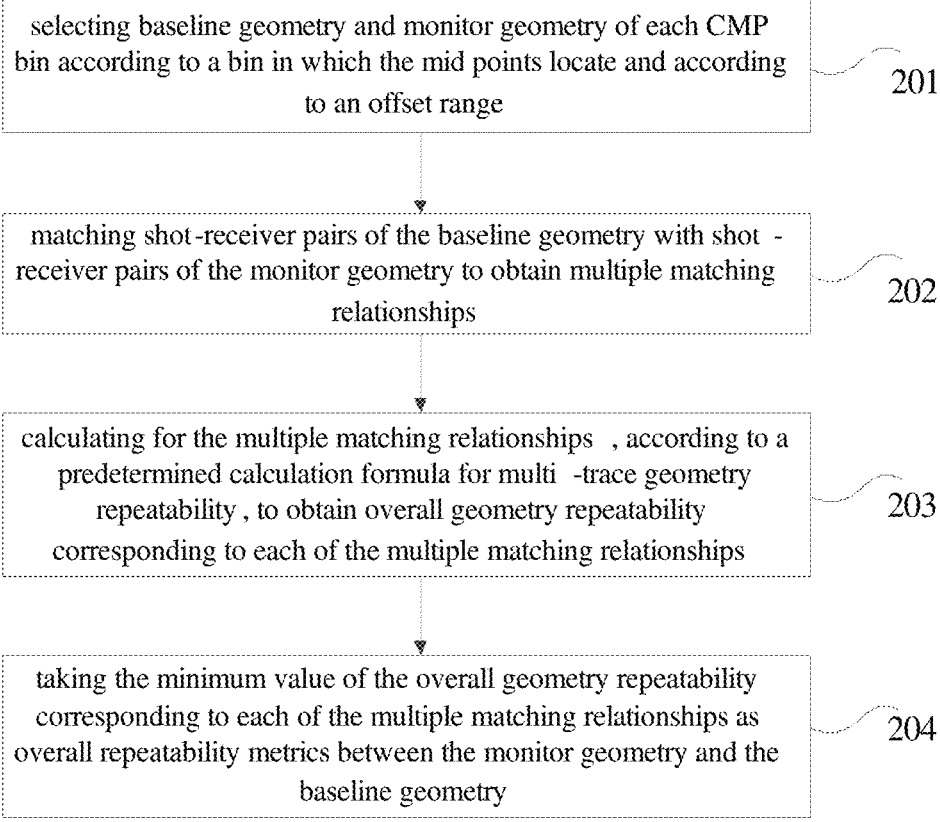
FIG. 2 is a flow chart of calculating repeatability of a geometry corresponding to each CMP bin into which the mid points fall, according to the method for determining overall metrics of seismic geometry repeatability in an embodiment of the present application.
Figure 3:
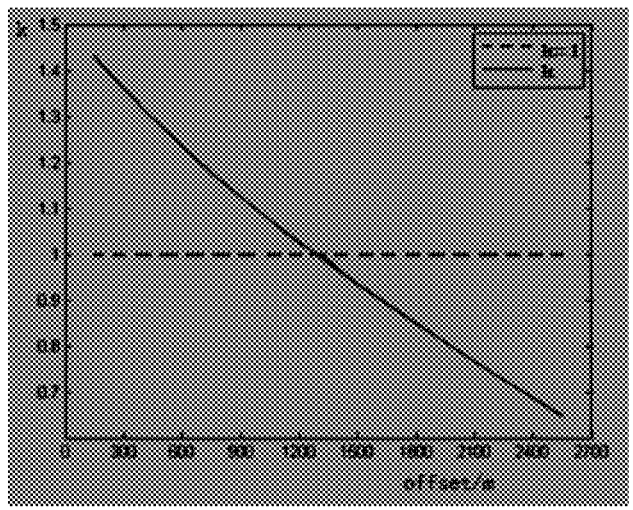
FIG. 3 is a schematic graph of a weighting coefficient varying with the offset in an embodiment of the present application.

As shown in FIG. 2, calculating the repeatability of geometry corresponding to each CMP bin into which the mid points fall by using the above method for determining overall metrics of seismic geometry repeatability may comprise the following steps:

Step 201: selecting baseline geometry and monitor geometry of each CMP bin according to a bin in which the mid points locate and according to an offset range;

Step 202: matching shot-receiver pairs of the baseline geometry with shot-receiver pairs of the monitor geometry to obtain multiple matching relationships;

Step 203: calculating overall geometry repeatability of each of the multiple matching relationships, according to a predetermined calculation formula for multi-trace geometry repeatability, to obtain overall geometry repeatabilities corresponding to the multiple matching relationships;

wherein, the predetermined calculation formula for multi-trace geometry repeatability can be expressed as below:

wherein, represents overall geometry repeatability, represents the number of baseline shot-receiver pairs matched in a current matching relationship, represents an offset of the $^{th}$ baseline shot-receiver pair in the current matching relationship, i=1, 2, . . . , m, represents repeatability between the $^{th}$ baseline shot-receiver pair and a corresponding monitor shot-receiver pair in the current matching relationship, represents a weighting coefficient of the $^{th}$ baseline shot-receiver pair in the current matching relationship. In this embodiment, may be calculated through a function in which the maximum acceptable NMO (Normal Move-out) stretch coefficient threshold is 20% and the velocity function is. FIG. 3 is a schematic graph of the weighting coefficient varying with the offset, as can be seen from FIG. 3, when the offset is larger than 300, as the offset increases, the weighting coefficient shows a decreasing trend. It should be noted that the weighting coefficient keeps the same during the calculation of repeatability of the current matching relationship and during the comparison of overall geometry repeatability.

Step 204: taking the minimum value among the overall geometry repeatabilities corresponding to the multiple matching relationships as overall repeatability metrics between the monitor geometry and the baseline geometry.

Figure 4:
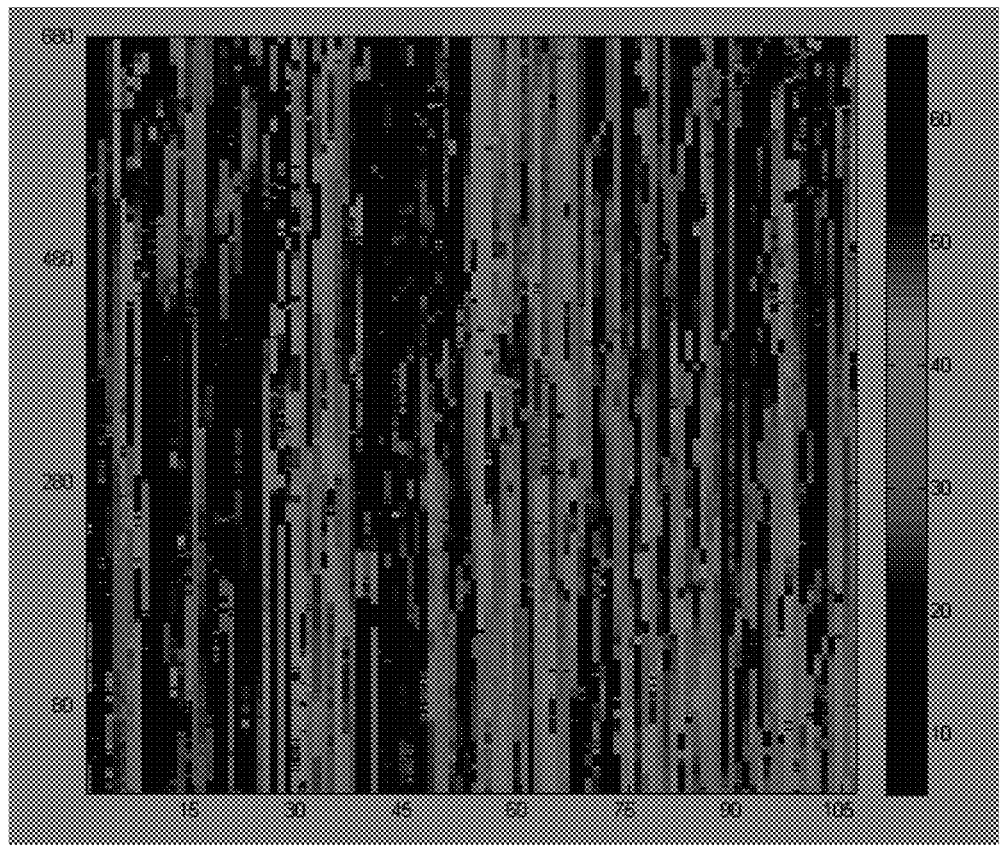
FIG. 4 is a schematic diagram of calculating repeatability of a geometry corresponding to each CMP bin into which the mid points fall by using the method for determining overall metrics of seismic geometry repeatability in an embodiment of the present application.

FIG. 4 shows a schematic diagram for calculating repeatability of the above geometry by adopting the method for determining overall metrics of seismic geometry repeatability.

Figure 5:
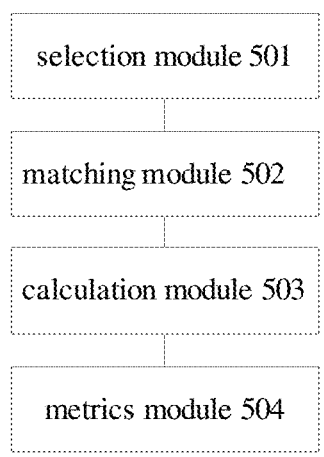
FIG. 5 is a structural block diagram of determining overall metrics of seismic geometry repeatability in an embodiment of the present application.

Based on the same inventive concept, a device for determining overall metrics of seismic geometry repeatability is also provided in embodiments of the present application, as described in the following embodiments. Since the principle for solving problems by the device for determining overall metrics of seismic geometry repeatability is similar to that of the method for determining overall metrics of seismic geometry repeatability, thus the implementation of the device for determining overall metrics of seismic geometry repeatability may refer to the implementation of the method for determining overall metrics of seismic geometry repeatability, and thus repetitive parts will be omitted. As used below, the terms "unit" or "module" may realize combination of software and/or hardware with predetermined functions. Although the device described in the following embodiments is preferably implemented by software, implementation through hardware or the combination of software and hardware may also be conceived. For example, the device can be implemented by a computer. FIG. 5 is a structural block diagram of a device for determining overall metrics of seismic geometry repeatability in an embodiment of the present application. As shown in FIG. 5, the device includes a selection module 501, a matching module 502, a calculation module 503 and a metrics module 504, which are explained below.

The selection module 501 is used for selecting baseline geometry and monitor geometry within a predetermined range of geometry;

The matching module 502 is used for matching shot-receiver pairs of the baseline geometry with shot-receiver pairs of the monitor geometry to obtain multiple matching relationships;

The calculation module 503 is used for calculating overall geometry repeatability of each of the multiple matching relationships, according to a predetermined calculation formula for multi-trace geometry repeatability, respectively, to obtain overall geometry repeatabilities corresponding to the multiple matching relationships;

The metrics module 504 is used for taking the minimum value among the overall geometry repeatabilities corresponding to the multiple matching relationships as overall repeatability metrics between the monitor geometry and the baseline geometry.

In an embodiment, the calculation module is specifically used to calculate the multi-trace geometry repeatability according to the following predetermined formula:

wherein, represents overall geometry repeatability, represents the number of baseline shot-receiver pairs matched in a current matching relationship, represents an offset of the $^{th}$ baseline shot-receiver pair in the current matching relationship, i=1, 2, . . . , m, represents a weighting coefficient of the $^{th}$ baseline shot-receiver pair in the current matching relationship, represents repeatability between the $^{th}$ baseline shot-receiver pairs and a corresponding monitor shot-receiver pair in the current matching relationship.

In an embodiment, the matching module includes: a number counting unit for counting the number of shot-receiver pairs of the baseline geometry and the number of shot-receiver pairs of the monitor geometry; a relationship matching unit for matching shot-receiver pairs of the baseline geometry with shot-receiver pairs of the monitor geometry according to the counting result of the number of shot-receiver pairs of the baseline geometry and the number of shot-receiver pairs of the monitor geometry to obtain multiple matching relationships.

In an embodiment, the relationship matching unit includes: a discarding subunit for discarding remaining unmatched shot-receiver pairs of the monitor geometry after matching when the number of shot-receiver pairs of the monitor geometry is larger than the number of shot-receiver pairs of the baseline geometry; an assigning subunit for assigning a predetermined value to each of one or more shot-receiver pairs of the baseline geometry remained after matching as repeatability between each of the one or more shot-receiver pairs of the baseline geometry and the corresponding shot-receiver pair of the monitor geometry.

In an embodiment, the selection module includes: a first selection unit for selecting baseline geometry and monitor geometry according to a bin in which the mid points locate and an offset range; or a second selection unit for selecting baseline geometry and monitor geometry based on a bin in which the reflection points locate and an offset range.

As can be seen from the above description, the embodiments of the present application realize the following technical effects: during the calculation of seismic geometry repeatability, firstly, baseline geometry and monitor geometry are selected within a predetermined range of geometry, then shot-receiver pairs of the baseline geometry and shot-receiver pairs of the monitor geometry are matched with each other to obtain multiple matching relationships, then calculations are conducted for the above multiple matching relationships, respectively, according to a calculation formula for multi-trace geometry repeatability, so that overall geometry repeatability corresponding to each of the multiple matching relationships can be obtained, the minimum value among the corresponding repeatabilities is taken as overall repeatability metrics between the monitor geometry and the baseline geometry. By using the above method, the situation of different number and uncertain matching of shot-receiver pairs between the baseline geometry and the monitor geometry can be solved, the aim of accurately determining repeatability of multiple shot-receiver pairs in time-lapse seismic acquisition can be achieved, and thus the monitoring efficiency of seismic geometry repeatability can be improved.

Embodiments of the present application also provide a device for determining overall metrics of seismic geometry repeatability. The device can comprise: a memory for storing instructions; and a processor that is coupled to the memory, wherein the processor is configured to perform the operations implemented by the above modules and units described in FIG. 5, when executing the instructions stored in the memory. The implementation of the device for determining overall metrics of seismic geometry repeatability may refer to the implementation of the device described in FIG. 5, and thus repetitive parts will be omitted.

Obviously, persons skilled in the art should appreciate that, the respective modules or the steps in the above mentioned embodiments of the present application can be implemented by using a universal computing device, they may be centralized on a single computing device or distributed on a network consisting of a plurality of computing devices, and alternatively, they may be implemented by using program codes that may be executed by computing devices, so that they may be stored in the storage device to be executed by computing devices, and in some circumstances, the steps as shown or described may be performed in an order different from that described herein, or they may be fabricated as various integrated circuit module, respectively, or multiple modules or steps therein may be fabricated as a single integrated circuit module. In this way, the embodiments of the present application are not limited to any specific combination of hardware and software.

The above are merely preferred embodiments of the present application, and are not intended to limit the present application. Various modifications and variations can be made to the embodiments of the present application for those skilled in the art. Any modifications, equivalent replacements, improvements and the like made within the spirit and principle of the present application shall be included within the protection scope of the present application.

What is claimed is:

1. A method for determining overall metrics of seismic observation system geometry repeatability, comprising:
   determining baseline observation system and monitor observation system within a predetermined range of observation system;
   matching shot-receiver pairs of the baseline observation system with shot-receiver pairs of the monitor observation system to obtain multiple matching relationships;
   calculating overall geometry repeatability of each of the multiple matching relationships, respectively, according to a predetermined calculation formula for multi-trace geometry repeatability, to obtain overall geometry repeatabilities corresponding to the multiple matching relationships; and
   taking the minimum value among the overall geometry repeatabilities corresponding to the multiple matching relationships as overall geometry repeatability metrics between the monitor observation system and the baseline observation system;
   wherein the step of matching the shot-receiver pairs of the baseline observation system with the shot-receiver pairs of the monitor observation system to obtain the multiple matching relationships comprises:
   counting the number of shot-receiver pairs of the baseline observation system and the number of shot-receiver pairs of the monitor observation system; and
   matching the shot-receiver pairs of the baseline observation system with the shot-receiver pairs of the monitor observation system, according to the counting result of the number of shot-receiver pairs of the baseline observation system and the number of shot-receiver pairs of the monitor observation system, to obtain the multiple matching relationships;
   wherein the step of matching the shot-receiver pairs of the baseline observation system with the shot-receiver pairs of the monitor observation system according to the counting result of the number of shot-receiver pairs of the baseline observation system and the number of shot-receiver pairs of the monitor observation system to obtain the multiple matching relationships comprises:
   when the number of shot-receiver pairs of the monitor observation system is larger than the number of shot-receiver pairs of the baseline observation system, discarding unmatched remaining shot-receiver pairs of the monitor observation system after matching; and
   when the number of shot-receiver pairs of the monitor observation system is smaller than the number of shot-receiver pairs of the baseline observation system, assigning a predetermined value to each of one or more shot-receiver pairs of the baseline observation system remained unmatched after matching as repeatability between each of the one or more shot-receiver pairs of the baseline observation system and a corresponding shot-receiver pair of the monitor observation system.

2. The method according to claim 1, wherein the predetermined calculation formula for multi-trace geometry repeatability is expressed as:

$$r = \sqrt{\frac{\sum_{i=1}^{m}(k(x_i)r_i^2)}{m}}$$

wherein, r represents overall geometry repeatability, m represents the number of baseline shot-receiver pairs matched in a current matching relationship, $x_i$ represents an offset of the $i^{th}$ baseline shot-receiver pair in the current matching relationship, i=1, 2, ..., m, $k(x_i)$ represents a weighting coefficient of the $i^{th}$ baseline shot-receiver pair in the current matching relationship, r represents repeatability between the $i^{th}$ baseline shot-receiver pair and a corresponding monitor shot-receiver pair in the current matching relationship.

3. The method according to claim 1, wherein the step of selecting the baseline observation system and the monitor observation system within the predetermined range of observation system comprises:
selecting the baseline observation system and the monitor observation system according to a bin in which the mid points locate and according to an offset range; or
selecting the baseline observation system and the monitor observation system according to a bin in which the reflection points locate and according to an offset range.

4. The method according to claim 2, wherein the step of selecting the baseline observation system and the monitor observation system within the predetermined range of observation system comprises:
selecting the baseline observation system and the monitor observation system according to a bin in which the mid points locate and according to an offset range; or
selecting the baseline observation system and the monitor observation system according to a bin in which the reflection points locate and according to an offset range.

5. A device for determining overall metrics of seismic observation system geometry repeatability, comprising:
a memory for storing instructions; and
a processor which is coupled to the memory and is configured to perform the following operations when executing the instructions stored in the memory:
select baseline observation system and monitor observation system within a predetermined range of observation system;
match shot-receiver pairs of the baseline observation system with shot-receiver pairs of the monitor observation system to obtain multiple matching relationships;
calculate overall geometry repeatability of each of the multiple matching relationships, respectively, according to a predetermined calculation formula for multi-trace geometry repeatability, to obtain overall geometry repeatabilities corresponding to the multiple matching relationships; and
take the minimum value among the overall geometry repeatabilities corresponding to the multiple matching relationships as overall geometry repeatability metrics between the monitor observation system and the baseline observation system;
wherein the processor is further configured to:
count the number of shot-receiver pairs of the baseline observation system and the number of shot-receiver pairs of the monitor observation system; and
match the shot-receiver pairs of the baseline observation system with the shot-receiver pairs of the monitor observation system, according to the counting result of the number of shot-receiver pairs of the baseline observation system and the number of shot-receiver pairs of the monitor observation system, to obtain the multiple matching relationships;
wherein the processor is further configured to:
discard unmatched remaining shot-receiver pairs of the monitor observation system after matching when the number of shot-receiver pairs of the monitor observation system is larger than the number of shot-receiver pairs of the baseline observation system; and
assign a predetermined value to each of one or more shot-receiver pairs of the baseline observation system remained unmatched after matching as repeatability between each of the one or more shot-receiver pairs of the baseline observation system and a corresponding shot-receiver pair of the monitor observation system when the number of shot-receiver pairs of the monitor observation system is smaller than the number of shot-receiver pairs of the baseline observation system.

6. The device according to claim 5, wherein the processor is specifically configured to calculate for the multi-trace geometry repeatability according to the following predetermined formula:

$$r = \sqrt{\frac{\sum_{i=1}^{m}(k(x_i)r_i^2)}{m}}$$

wherein, r represents overall geometry repeatability, m represents the number of baseline shot-receiver pairs matched in a current matching relationship, $x_i$ represents an offset of the $i^{th}$ baseline shot-receiver pair in the current matching relationship, i=1, 2, ..., m, $k(x_i)$ represents a weighting coefficient of the $i^{th}$ baseline shot-receiver pair in the current matching relationship, $r_i$ represents repeatability between the $i^{th}$ baseline shot-receiver pair and a corresponding monitor shot-receiver pair in the current matching relationship.

7. The device according to claim 5, wherein the processor is further configured to:
select the baseline observation system and the monitor observation system according to a bin in which the mid points locate and according to an offset range; or
select the baseline observation system and the monitor observation system according to a bin in which the reflection points locate and according to an offset range.

8. The device according to claim 6, wherein the processor is further configured to:
select the baseline observation system and the monitor observation system according to a bin in which the mid points locate and according to an offset range; or
select the baseline observation system and the monitor observation system according to a bin in which the reflection points locate and according to an offset range.

* * * * *